Oct. 8, 1940.  A. P. PFEIFFER  2,217,454

GREETING OR ADVERTISING CARD DEVICE

Filed April 8, 1940

Alfred P. Pfeiffer, Inventor.
By Walter C. Ross, Attorney.

Patented Oct. 8, 1940

2,217,454

UNITED STATES PATENT OFFICE 2,217,454

GREETING OR ADVERTISING CARD DEVICE

Alfred P. Pfeiffer, Westfield, Mass.

Application April 8, 1940, Serial No. 328,410

4 Claims. (Cl. 41—34)

This invention relates to improvements in greeting or advertising card devices and is directed more particularly to the provision of such a device including a card having an appropriate message or announcement and a flower or bouquet of flowers attached thereto.

It is one of the principal objects of the invention to provide a novel card-like device having associated therewith a flower or flowers in such a way that the same more or less simulates a real flower or bouquet thereof. As will appear, the device includes a relatively thin card member having a substantially flat front surface, at least, and the flower or flowers are so arranged as to have bulk and fullness like real flowers and to project outwardly of the forward face of the card.

As special features, the card of the invention may be produced at low cost, even when real live flowers are used, so as to provide a device of the character being described which is attractive both in appearance and as a commercial proposition. The card itself may bear any desired indicia and, as will appear, the flower or ornamenting article or articles may be attached thereto in any one of several various ways.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawing wherein:

Figure 4:
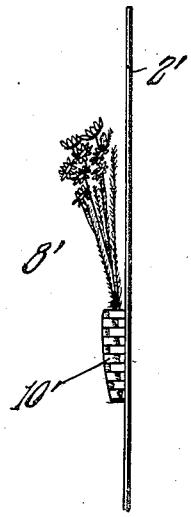
Fig. 4 is a view similar to Fig. 3 showing a modification thereof.

Referring now to the drawing more in detail, wherein similar reference figures refer to like parts, and referring more particularly to the preferred form of my invention which has been selected for illustrative purposes, I have shown what I call a supporting or body member 2 and this takes the form of a card which may be of any size or shape. Usually the card-like member will be more or less rectangular in shape and will be formed from cardboard, paper, or other suitable sheet material which will permit economical and practical use of the device of the invention as a greeting card or for advertising, announcement, or other more or less similar purposes.

Figure 1:
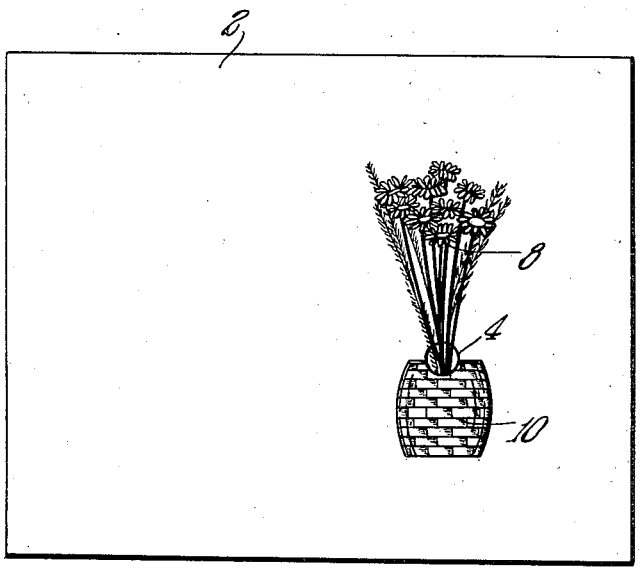
Fig. 1 is a front elevational view of the preferred form of the device of the invention.
Figure 3:
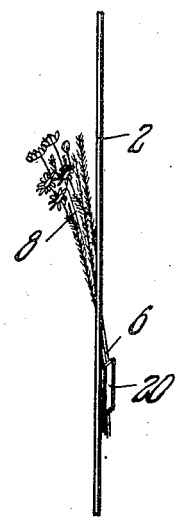
Fig. 3 is an end elevational view of the form shown in Figs. 1 and 2.
Figure 2:
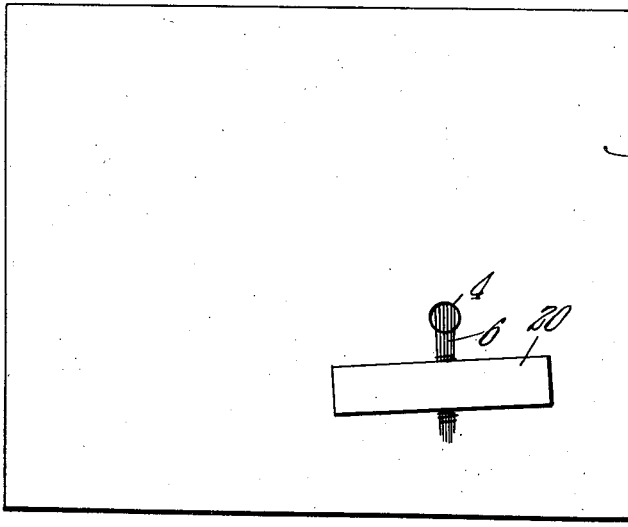
Fig. 2 is a rear elevational view of what is shown in Fig. 1.

According to the preferred form of the invention which is shown in Figs. 1-3 inc. the card 2 has an opening or slit 4 therethrough as shown. It is through this opening 4 that I insert the lower end or ends, that is the stem portion or portions 6 of a flower or flowers 8 so that said ends or stems 6 will be disposed at the rear of the card 10 and the blossoms, or at least the more desirable parts of the flowers will be disposed at the front of the card, all as shown.

This arrangement permits of, or provides for, several advantages.

First, it renders the less attractive parts of the articles 8, which, of course, is their stems, invisible from the front of the card. This is desirable because I intend that the front surface of the card, which is seen in Fig. 1, bear some suitable message which the user desires to convey to another.

When the device of the invention takes the form of a greeting card, the message may consist merely of such expressions as "Happy Birthday," "Easter Greetings," etc., or of other appropriate verses, or, perhaps, merely a picture or pictures, or other indicia. As stated, the device may be in the form of some desired announcement, as of the opening of a new flower shop, for example, in which case the indicia on that part of the front surface of the card which is not concealed by the flowers 8 may refer thereto.

In any event, the card is intended to both convey a message and be attractive in appearance. The message may be supplied as by printing or otherwise while a life-like flower or flowers will obviously tend to add to the beauty and novelty of the card. As will be appreciated, the bulk or fullness of the flowers which is permitted by the new construction shown only enhances the effectiveness of the device.

Secondly, the preferred arrangement above described makes it possible to provide the representation on the forward face of the card of a vase, basket, or the like, such as is shown at 10 which will be preferably located just below the slot or opening 4 so that the body or flowering portion 8 of the articles may have the appearance of standing in the container as in the case of a real bouquet received as a gift or otherwise.

Thirdly, the construction permits the flowers or articles to be attached to, or secured against unwanted withdrawal from association with, the card by a means which will not be visible from the front or top of the card. That is, the securing means may accordingly be such that it will not detract from the attractiveness of what is presented by the front or forward face of the device.

According to the preferred form of the invention, the representation of the container 10 is formed by printing, painting, or the like on the front surface of the card just below the slot 4. While I have shown the container to represent a basket, it will be obvious that it could be a vase or any other desired receptacle.

The manner in which the lower end portions or stems 6 of the flowers 8 are secured to the rear face of the card 2 may also, of course, vary widely. It is desirable, however, as above mentioned, that the blossom, or what might be termed the flowery or really ornamental part of the article be disposed adjacent the front face of the card and in substantial fullness project forwardly of the plane thereof as is shown in Fig. 3.

It is equally desirable that both any securing means and the less attractive part of the flower or bouquet, that is the stem or stems 6, be at the rear of the card so as to be concealed thereby. It is for these reasons that the co-operative arrangement of the stem-receiving slot 4 and the representation of a container are particularly suitable and also that the stated means for attaching the articles to the card be not visible from the front.

The said securing means might consist of a strip of binding material 20 having an intermediate portion overlying the portions 6 and having opposite ends secured, as by adhesive or otherwise to the rear face of the card 2. The securing could, of course, be done by means of stapling, thread, stitching, sealing wax, or other similar or different means, it being the principal object to provide the securing in an inexpensive and easy manner which neither detracts from the attractiveness of the device nor adds to any appreciable extent to its cost.

A modification of the invention is shown in Fig. 4. Here there is a card 2', like the card 2, with a protruding container-representing member 10' secured in any suitable manner to the forward face thereof.

Said member 10' may obviously vary in form, as by being formed of wood, plastic, papier mâché, or other material but it preferably has a hollow part open at the upper end thereof. The ornamental articles, such as flowers 8' may have their stems or lower end portions (not shown) extending into the hollow member and secured thereto or to the card however is desired.

In any event the flowers 8' will have the fullness above referred to and the arrangement will be such that the articles project outwardly from the plane of the forward face of the card 2' as is clearly shown in Fig. 4. Thus the life-like and attractive appearance of the device is maintained.

It is a particularly novel feature of the device being here described that the flowers may be natural flowers of the so-called everlasting type which may be wetted and which, when wetted, will close to buds and, upon drying, will open into blossom. This, of course, adds to the uniqueness of the device and the card may bear suitable instructions or information to this effect.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range or equivalency of the claims are therefore intended to be embraced therein.

What it is desired to claim and secure by Letters Patent of the United States is:

1. As a new article of manufacture, a card device of the class described comprising in combination, a relatively thin card member of substantially uniform thickness having a substantially flat forward surface, said member being provided with an opening therethrough, and a flower-like member having a lower end portion extending through said opening and attached to the rear face of said card member and having an upper portion projecting outwardly of the plane of said surface.

2. As a new article of manufacture, a card device of the class described comprising in combination, a relatively thin card member having a substantially flat forward surface, said member being provided with an opening therethrough and the representation of a container on said surface below said opening and a flower-like member having a lower end portion extending through said opening and attached to the rear face of said card member and having an upper portion projecting outwardly of the plane of said surface above said opening.

3. As a new article of manufacture, a card device of the class described comprising in combination, a relatively thin card member having a substantially flat forward surface, a container secured to said surface, and a flower-like member attached to said card member and having an upper part thereof projecting outwardly of the plane of said surface and a lower part extending into said container.

4. As a new article of manufacture, a card device of the class described comprising in combination, a relatively thin card member having a substantially flat forward surface, said member being provided with an opening therethrough, a container secured to said surface adjacent said opening, and a flower-like member having a lower end portion extending through said opening and attached to the rear face of said card member and having an upper portion projecting outwardly of the plane of said surface above said container.

ALFRED P. PFEIFFER.